(12) United States Patent
Suda

(10) Patent No.: US 7,984,687 B2
(45) Date of Patent: Jul. 26, 2011

(54) TEMPERATURE-SENSITIVE INDICATOR

(75) Inventor: Hiroshi Suda, Saitama (JP)

(73) Assignee: Nippon Thermostat Co., Ltd, Tokyo (JP)

( * ) Notice: Subject to any disclaimer, the term of this patent is extended or adjusted under 35 U.S.C. 154(b) by 150 days.

(21) Appl. No.: 12/522,893

(22) PCT Filed: Dec. 3, 2007

(86) PCT No.: PCT/JP2007/001338
§ 371 (c)(1),
(2), (4) Date: Jul. 10, 2009

(87) PCT Pub. No.: WO2008/084515
PCT Pub. Date: Jul. 17, 2008

(65) Prior Publication Data
US 2010/0043696 A1    Feb. 25, 2010

(30) Foreign Application Priority Data

Jan. 10, 2007    (JP) .................................. 2007-002000

(51) Int. Cl.
*G01K 11/06* (2006.01)
*G01K 11/12* (2006.01)
(52) U.S. Cl. ........................................ 116/219; 116/216
(58) Field of Classification Search .................. 116/207, 116/216, 217, 218, 219; 374/102, 106, 159, 374/160, 161, 162
See application file for complete search history.

(56) References Cited

U.S. PATENT DOCUMENTS

| 3,954,011 | A | | 5/1976 | Manske | |
|---|---|---|---|---|---|
| 3,961,530 | A | * | 6/1976 | Helgesson | ..................... 374/162 |
| 4,051,804 | A | * | 10/1977 | Garnett | ......................... 116/207 |
| 4,998,827 | A | | 3/1991 | Holzer | |
| 5,120,137 | A | * | 6/1992 | Ou-Yang | ....................... 374/106 |
| 5,368,905 | A | | 11/1994 | Ohno | |
| 6,968,804 | B1 | * | 11/2005 | Barbieri et al. | ............... 116/219 |
| 2010/0031868 | A1 | * | 2/2010 | Suda et al. | ..................... 116/216 |

FOREIGN PATENT DOCUMENTS

| EP | 528712 A1 * | 2/1993 |
|---|---|---|
| JP | 58-10709 B2 | 2/1983 |
| JP | 63-277944 A | 11/1988 |
| JP | 64-53124 A | 3/1989 |
| JP | 5-72054 A | 3/1993 |
| WO | WO 2009130831 A1 * | 10/2009 |
| WO | WO 2010086937 A1 * | 8/2010 |

* cited by examiner

*Primary Examiner* — R. Alexander Smith
(74) *Attorney, Agent, or Firm* — Smith Patent Office

(57) ABSTRACT

To provide a temperature sensitive indicator that is capable of easily control the temperature of the temperature sensitive indicator itself and is not affected by the temperature of a finger when the temperature sensitive indicator is operated. In the temperature sensitive indicator that has: a base body; a capsule placed on the base body and filled with a heat-sensitive material; an absorbent member placed on an upper part of the capsule; a cover covering at least the capsule and the absorbent member; and capsule breaking means formed therein with a space through which the base body and the cover are inserted, the base body and the cover are pulled out through the space of the capsule breaking means, whereby the capsule is broken by the capsule breaking means.

17 Claims, 3 Drawing Sheets

TEMPERATURE-SENSITIVE INDICATOR

BACKGROUND OF THE INVENTION

1. Field of the Invention

The present invention relates to a temperature sensitive indicator for irreversibly indicating whether the temperature is at least or no more than a predetermined temperature, and particularly to a temperature sensitive indicator capable of visually confirming whether exposure to an environment of at least or no more than the predetermined temperature has occurred.

2. Description of the Related Art

In recent years, temperature control has been important in quality control of commercial goods and products. For example, when fresh products, such as fresh food and cut flowers, medical goods, and semiconductor materials are exposed to a predetermined temperature or higher without being provided with temperature control, the qualities of these commercial goods and products might be lowered or degraded and bacteria might grow, causing rottenness.

For this reason, strict temperature control is necessary not only at the time of production of these commercial goods and products but also at the time of deliver and storage of the same, and a temperature sensitive indicator is used as the means for continuously monitoring the temperature control.

The one described in Patent Document 1 (Japanese Patent Publication No. S58-10709) is proposed as such a temperature sensitive indicator. The temperature sensitive indicator described in this Patent Document 1 is described with reference to FIGS. 3 and 4.

This temperature sensitive indicator 100 has a channel-shaped carrier 102, and this channel-shaped carrier 102 has a base 104 and side walls 106 extending upward from the rims on both sides of the base. Each of the side walls 106 is in a waveform and has an upper groove 108, a central part 110, and a lower groove 112. The channel-shaped carrier 102 is made of a flexible hard material that is appropriate for spreading the both side walls 106 outward by force of hands.

Consequently, a permeable material 114 is placed on the base 104. The permeable material 114 is formed from blotting paper so as be provided with a straight or bent path and a display area 116.

A porous matrix 118 that absorbs a fluid saturant is attached to a matrix holder 120. As the fluid saturant absorbed by the porous matrix 118, for example, a substance that is solid at a temperature for storing frozen food but becomes liquid at a temperature for defrosting food (room temperature, for example) is selected.

Furthermore, the matrix holder 120 has an upper protective cover part 122 and a thick end part 124 with a slot 126. The porous matrix 118 is inserted into the slot and held on a lower surface of the cover part 122. Note that this display device 100 further has attachment means 128 configured by a pressure sensitive adhesive layer 130 and a removable protective liner 132.

In order to operate this temperature sensitive indicator 100, the upper protective cover 122 and the channel-shaped carrier 102 are pressed together. Consequently, the cover 122 bends the side walls 106 outward and moves toward the permeable material 114, and then the permeable material 114 comes into contact with the porous matrix 118.

The porous matrix 118 and the upper protective cover 122 overlapped thereon are deflected toward the permeable material 114 by the elasticity of the side walls 106 within the lower groove 112. In this manner, the porous matrix 118 and the permeable material 114 are held tightly in a contact state by the elasticity of the side walls 106.

Because the porous matrix 118 and the permeable material 114 are adhered tightly to each other fluid flows out of the porous matrix 118 into the permeable material 114 when the temperature becomes a predetermined temperature or higher, and the fluid moves inside the permeable material 114. Generally, the fluid is visibly colored with a dye that is included in the fluid, and therefore it is possible to visually confirm and determine that a commercial good or product with the temperature sensitive indicator 100 is exposed to an environment of at least or no more than the predetermined temperature. Further, because the permeable material 114 has the straight or bent path and the display area 116, the forward travel of the fluid can be observed, and the time at which the commercial good or product is exposed to the environment of at least or no more than the predetermined temperature can also be determined.

Patent Document 1: Japanese Patent Publication No. S58-10709

Incidentally, in the temperature sensitive indicator disclosed in Patent Document 1, because the fluid saturant is absorbed by the porous matrix, the fluid saturant changes to a liquid phase and evaporates when storing the temperature sensitive indicator in a high-temperature environment, and there is a possibility that the liquid solution of the chemical substance evaporates even when the fluid saturant does not change to a liquid phase. For this reason, a problem in storing the temperature sensitive indicator is that the temperature of the temperature sensitive indicator itself needs to be controlled.

Moreover, in order to operate the temperature sensitive indicator, the upper protective cover and the channel-shaped carrier are pressed together. Therefore, a problem in pressing the upper protective cover and the channel-shaped carrier together is that the fluid saturant detects the temperature of a finger through the upper protective cover.

The present invention was contrived to solve the problems described above, and an object of the present invention is to provide a temperature sensitive indicator that is capable of easily control the temperature of the temperature sensitive indicator itself and is not affected by the temperature of a finger when the temperature sensitive indicator is operated.

SUMMARY OF THE INVENTION

The present invention is contrived to achieve the object described above, and the temperature sensitive indicator of the present invention has: a base body; a capsule placed on the base body and filled with a heat-sensitive material; an absorbent member placed on an upper part of the capsule; a cover covering at least the capsule and the absorbent member; and capsule breaking means formed therein with a space through which the base body and the cover are inserted, wherein at least the base body, the capsule, and the absorbent member are pulled out through the space of the capsule breaking means, whereby the capsule is broken by the capsule breaking means.

The temperature sensitive indicator has: a base body; an absorbent member placed on the base body; a capsule placed on the absorbent member and filled with a heat-sensitive material; a cover covering at least the capsule and the absorbent member; and capsule breaking means formed therein with a space through which at least the base body, the capsule, and the absorbent member are inserted, wherein the base body, the capsule, and the absorbent member are pulled out through the space of the capsule breaking means, whereby the capsule is broken by the capsule breaking means.

In the temperature sensitive indicator according to the present invention, because the capsule is broken by pulling out the base body, the capsule, and the absorbent member through the space of the capsule breaking means, the capsule can be broken without having an impact of the temperature of the pressing finger. Further, because the capsule is broken by pulling out the base body, the capsule, and the absorbent member through the space of the capsule breaking means, the capsule can be broken more reliably and evenly.

Note that the capsule breaking means has formed therein the space through which the base body, the capsule, and the absorbent member are inserted, and breaks the capsule by inserting the base body and the cover through the space.

Here, it is preferred that the capsule breaking means be a holding member for holding at least the base body and the cover, and that at least the base body, the capsule, and the absorbent member be pulled out from the holding member, whereby the capsule is broken by the holding member.

Moreover, it is preferred that the capsule breaking means be a holding member for holding at least the base body and the cover, that the cover be formed in a pouch-like shape so that the base body, the capsule, and the absorbent member be housed inside the pouch-shaped cover, that the holding member hold at least the base body and the cover, and that at least the base body, the capsule, and the absorbent member be pulled out through the space of the holding member, whereby the capsule is broken by the holding means.

In addition, as the heat-sensitive material, it is possible to use a so-called wax that enters a liquid phase at a predetermined temperature or above, a colored gel that enters a liquid phase at a predetermined temperature or lower (manufactured by Advanced Softmaterials Inc.: product name, Slide Ring Gel), or a product named "Ekka" (manufactured by Futaba Chemical Co., Ltd.) having two or more melting points (coagulation points), which keeps its solid state within a range of predetermined temperatures and enters a liquid state at a lower limit temperature or below and an upper temperature or below of the predetermined temperature.

Therefore, with use of the colored gel that changes to a liquid phase at a predetermined temperature or lower, the temperature sensitive indicator can be suitably used in lettuces, potatoes, bean curd, carbonated beverages (beer), or other commercial goods or products, the quality of which is degraded at the time of freezing.

In addition, it is preferred that the holding member be provided inside a case, that the capsule and the absorbent member be contained in the case, that the base body and the cover be contained in the case such that leading end parts of the base body and the cover are disposed outside the case, and that the base body and the cover disposed outside the case be pulled out and ejected to the outside of the case, whereby the capsule is broken.

As described above, because the majority of the base body and cover are contained in the case, the majority of the base body and cover can be prevented from contacting a hand or a finger of a human until the temperature sensitive indicator are used, while enabling easy preservation management (storing) and temperature control. Moreover, because the base body and the cover disposed outside the case are pulled out and ejected to the outside to break the capsule, the temperature sensitive indicator can be brought easily into an operating state.

In addition, preferably, a concave part is formed on a lower surface of the absorbent member and the capsule is contained between the concave part and the base body.

Because the capsule is contained in the concave part formed on the absorbent member, the capsule can be broken reliably and easily.

In addition, it is preferred that a concave part containing the capsule be formed on an upper surface of the base body, and that the absorbent member cover an upper part of the concave part. Because the capsule is contained in the concave part formed on the upper surface of the base body, the capsule can be broken reliably and easily.

It is also preferred that a display label be formed integrally with the absorbent member. It is also preferred that the display label be formed integrally with the cover.

According to the temperature sensitive indicator of the present invention, not only is it possible to control the temperature of the temperature sensitive indicator itself easily, but also a temperature sensitive indicator that is not affected by the temperature of a finger when operating the temperature sensitive indicator can be obtained. Further, because the capsule is broken by pulling out the base body and the cover through the space of the capsule breaking means, the capsule can be broken more reliably and evenly.

DESCRIPTION OF THE PREFERRED EMBODIMENTS

Figure 1:
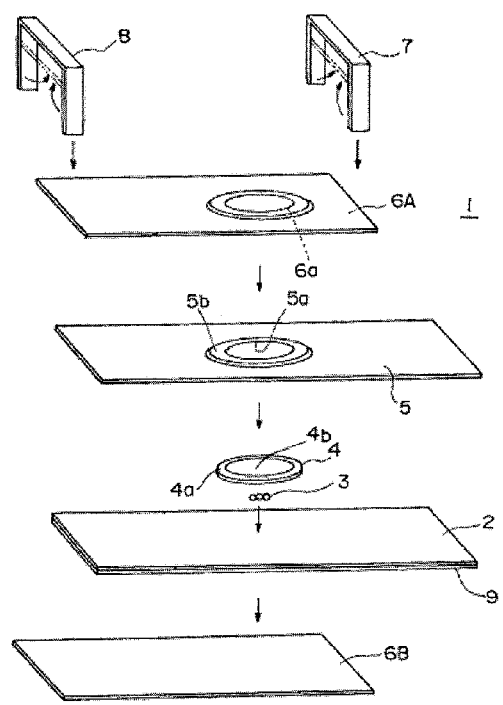
FIG. 1 is an exploded perspective view showing a temperature sensitive indicator according to an embodiment of the present invention.

An embodiment of the present invention is described hereinafter with reference to FIG. 1. FIG. 1 is an exploded perspective view showing a temperature sensitive indicator according to an embodiment of the present invention.

As shown in FIG. 1, this temperature sensitive indicator 1 has a base body 2, a capsule 3 filled with a heat-sensitive material and placed on the base body 2, an absorbent member 4 placed on an upper part of the capsule 3, a display label 5 having formed thereon a window 5a to which a central part 4b of the absorbent member 4 is exposed, and a cover 6A covering the upper side of the display label 5.

On a rear surface of the base body 2, an adhesive layer to be attached to a product or a commercial good is formed, and also release paper 9 covering the adhesive layer is provided. Therefore, when using the temperature sensitive indicator 1, the temperature sensitive indicator 1 can be attached to the product or commercial good by peeling the release paper 9.

Further, a cover 6B for covering the upper side of the release paper 9 of the base body 2 is provided. Although the drawing shows a case in which the base body 2, the display label 5 and the like are held between the covers 6A, 6B, not only this case by also a case where the covers 6A, 6B are formed in one pouch-shaped cover to house the base body 2, the display label 5 and the like therein may be possible.

Moreover, the cover 6A is preferably configured from a transparent member, such as a transparent synthetic resin material, but when configuring the cover 6A from a nontransparent member, at least a window needs to be formed so that the absorbent member can be visually confirmed.

As the heat-sensitive material filling the capsule 3, for example, a so-called colored wax in which an oil-soluble pigment, colorant, or dye is mixed with a solid solution made of linear carbon hydrogen or a composition of linear carbon hydrogen can be used. Moreover, as the heat-sensitive material, a chemical substance that is melted or discolored at a predetermined temperature without dissolving it with water may be used. The colored gel that changes to a liquid phase at a predetermined temperature or lower (manufactured by Advanced Softmaterials Inc.: product name, Slide Ring Gel) can also be used. Moreover, the product named "Ekka" (manufactured by Futaba Chemical Co., Ltd.) having two or more melting points (coagulation points), which keeps its solid state within a range of predetermined temperatures and enters a liquid state at a lower limit temperature or below and an upper temperature or below of the predetermined temperature can be used as well.

Therefore, with use of the colored gel that changes to a liquid phase at a predetermined temperature or lower, the temperature sensitive indicator can be suitably used in lettuces, potatoes, bean curd, carbonated beverages (beer), or other commercial goods or products, the quality of which is degraded at the time of freezing.

The colored wax described above is used as an example in the following description.

The absorbent member 4 may be able to absorb the heat-sensitive material, and a conventionally used paper filter, porous body (film, sponge, etc.), silica gel and the like can be used.

The absorbent member 4 is formed into a circular shape in plan view, wherein the central part 4b is formed into an upward convex shape, and an outer circumferential part 4a is formed into a ring having a flat surface.

Specifically, the concave part containing the capsule 3 is formed on a lower surface of the central part 4b of the absorbent member 4. When placing the absorbent member 4 on the base body 2, the concave part on the lower surface of the central part 4b of the absorbent member 4 is closed by the outer circumferential part 4a of the absorbent member 4 by placing the absorbent member 4 on the base body 2, whereby the movement of the capsule 3 is restricted.

The display label 5 made of paper has the window 5a formed in a central part of the display label 5, and the central part 4b (convex part) of the absorbent member 4 is formed so as to be fitted into the window 5a.

The outer circumferential part 4a of the absorbent member 4 is held by an outer rim part 5b of the window 5a.

Note that when the central section (absorbent member 4) is colored (generates a color), a warning that indicates that the temperature sensitive indicator 1 is put under an environment of at least predetermined temperature is described on an upper surface of the display label 5.

A concave part 6a that protrudes to the upper surface side is formed on a lower surface side of the cover 6A. The absorbent member 4, the window 5a and outer rim part 5b of the display label are contained in the concave part 6a. The covers 6A are formed from a transparent synthetic resin so that the colored (color generation) state of the absorbent member 4 can be visually confirmed from the upper side. When the cover 6A is formed from a nontransparent member, it is preferred that a window be formed by cutting the concave part, so that the absorbent member 4 can be visually confirmed.

The cover 6A is formed from a heat insulation member, because when pressing the cover 6A with a finger, the heat of the finger is transmitted to the capsule 3.

In addition, a holding member 7 that holds leading end parts of the stacked base body 2, display label 5, covers 6A, 6B and release paper 9, as well as a holing member 8 that holds rear end parts of the base body 2 and covers 6A, 6B are further provided. The holding members 7, 8 are so configured to stack the base body 2, capsule 3, absorbent member 4, display label 5, and covers 6A, 6B and thereafter bend the leading end parts of these components. Specifically, the base body 2, the capsule 3, the absorbent member 4, the display label 5, the covers 6A, 6B, and the release paper 9 are inserted into and held by a space formed by the holding members 7, 8.

Further, the holding members 7, 8 are configured such that the base body 2, the display label 5, the covers 6A, 6B, and the release paper 9 can be pulled out of the holding members 7, 8 by holding the leading end parts of the base body 2, display label 5, covers 6A, 6B, and release paper 9 and acting a force thereon.

Note that it is not necessary to always provide both the holding members 7, 8, and thus only a holding member through which the capsule 3 passes by pulling out the capsule 3 may be provided. In other words, when pulling out of the holding member 7, at least the holding member 7 may be provided.

Adhesive layers may be formed between the base body 2 and the display label 5 and between the display label 5 and the cover 6A to integrate the base body 2, the display label 5 and the cover 6A.

The outer rim part 4a of the absorbent member 4 may be fixed to the base body 2 using an adhesive. By fixing the outer rim part 4a of the absorbent member 4 in this manner, the capsule 3 can be prevented from moving to the outside of the absorbent member 4 when the capsule 3 is squashed.

In addition, the above has described the case where the concave part for containing the capsule 3 is formed on the lower surface of the central part 4b of the absorbent member 4, the concave part may be formed on the upper surface of the base body 2, and the capsule 3 may be housed in this concave part. In this case, the absorbent member 4 may be formed into a flat shape to close the concave part of the base body 2.

In the temperature sensitive indicator that is configured as described above, because the colored wax is covered by the capsule 3, evaporation of the colored wax is inhibited even when the temperature sensitive indicator is exposed to an environment of a predetermined temperature or above, and thereby deterioration of the temperature sensitive indicator is inhibited.

Figure 2:
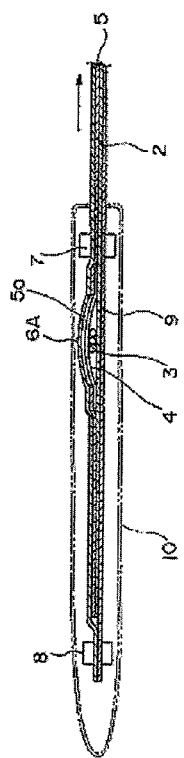
FIG. 2 is a cross-sectional diagram showing a state before use of the temperature sensitive indicator according to a second embodiment of the present invention.
Figure 3:
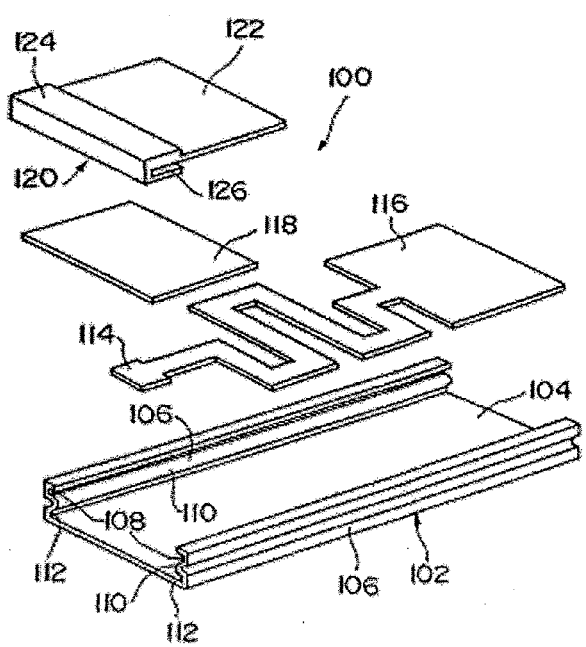
FIG. 3 is an exploded perspective view showing a conventional temperature sensitive indicator.
Figure 4:
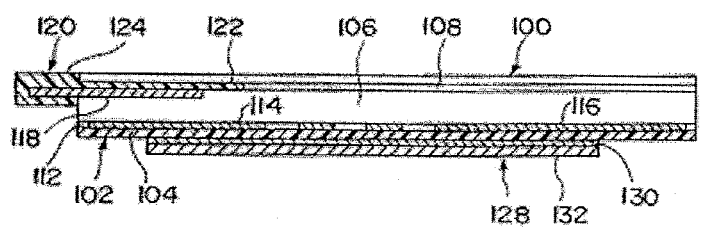
FIG. 4 is a cross-sectional diagram showing a state before use of the temperature sensitive indicator shown in FIG. 3.

When using (setting up) the temperature sensitive indicator, the base body 2, the absorbent member 4, the display label 5, the covers 6A, 6B, and the release paper 9 are pulled out, as shown by the arrow in FIG. 2. At this moment, when the capsule 3 passes through the holding member 7, the capsule 3 is broken and consequently the temperature sensitive indicator enters a usage state. Specifically, by pulling out (drawing out) the base body 2, absorbent member 4, display label 5 and the like from the holding member, the capsule 3 is broken and consequently the temperature sensitive indicator enters the usage state. Thereafter, the covers 6A, 6B and the release sheet 9 are peeled and pasted to a product or a commercial good.

In the embodiment described above, although the temperature sensitive indicator is brought into the usage state by pulling out the base body 2, absorbent member 4, display label 5, covers 6A, 6B, and release paper 9, at least the base body 2, the capsule 3, and the absorbent member 4 may be pulled out. It is preferred that the temperature sensitive indicator be detached by pulling out (drawing out) these components as with the case where the cover 6B and release paper 9 are pulled out, so that the temperature sensitive indicator can be brought into the usage state. Especially when the covers 6A, 6B are formed into pouches, the base body 2, the capsule 3, the absorbent member 4, the display label 5, and the release paper 9 may be pulled out. When the temperature sensitive indicator is configured such as to pull out the base body 2, the capsule 3, the absorbent member 4 and the display label 5, leaving the covers 6A, 6B, it is preferred that the display label 5 be formed from a synthetic resin and that the window 5a be formed into a transparent lens part.

By bringing the temperature sensitive indicator into the usage state as described above, the heat of the finger is prevented from being transmitted to the colored wax. Moreover, because the capsule 3 is located within the concave part 4b of the absorbent member 4, the capsule 3 can be broken reliably without letting the capsule 3 escape.

When a product on which the temperature sensitive indicator 1 pasted is exposed to an environment of a predetermined temperature or above, the colored wax is dissolved and absorbed by the absorbent member 4. The colored state (color generation state) of the absorbent member 4 can be visually confirmed from the upper side of the cover 6A through the transparent cover 6A. Accordingly, it is possible to determine whether or not the product is exposed, even once, to the environment of a predetermined temperature or above.

Next, a second embodiment of the present invention is described with reference to FIG. 2. Note that FIG. 2 is a cross-sectional diagram showing a state before use of the temperature sensitive indicator.

This embodiment is characterized in that the base body 2, capsule 3, absorbent member 4, display label 5, cover 6A, release paper 9, and holding members 7, 8 are contained in a case 10, as shown in FIG. 2. Specifically, the holding members 7, 8 are provided within the case 10, the capsule 3 and the absorbent member 4 are contained in the case 10, and the base body 2, the display label 5, and the covers 6 are contained in the case 10 such that the leading ends of these components are disposed outside the case 10.

The capsule 3 is broken, by pulling the base body 2 and the cover 6A disposed outside the case 10 and ejecting the base body 2 and the cover 6A to the outside the case 10.

In FIG. 2, although the illustration of the cover 6B is omitted, the cover 6B may be formed. When the temperature sensitive indicator is configured such that the base body 2, the capsule 3, the absorbent member 4 and the display label 5 are pulled out, leaving the covers 6A, 6B, it is preferred that the display label 5 be formed from a synthetic resin and that the window 5a be formed into a transparent lens part. However, when the display label 5 is formed from a paper material, the window 5a needs to be formed.

Because the majority of the base body 2 and cover 6A are contained in the case, the majority of the base body 2 and cover 6A and the capsule 3 can be prevented from contacting a hand or a finger of a human until the temperature sensitive indicator are used, while enabling easy preservation management (storing) and temperature control. Moreover, because the base body 2 and the cover 6A that are disposed outside the case are pulled out and ejected to the outside of the case 10 to break the capsule 3, the temperature sensitive indicator 1 can be brought easily into an operating state.

Although the above embodiment describes the case where the capsule is filled with a so-called colored wax in which an oil-soluble pigment, colorant, or dye is mixed with a solid solution made of linear carbon hydrogen or a composition of linear carbon hydrogen, the colored gel that changes to a liquid phase at a predetermined temperature or lower (manufactured by Advanced Softmaterials Inc.: product name, Slide Ring Gel) can also be used as the heat-sensitive material, in place of the colored wax that changes to a liquid phase at a predetermined temperature or above.

Therefore, with use of the colored gel that changes to a liquid phase at a predetermined temperature or lower, the temperature sensitive indicator can be suitably used in lettuces, potatoes, bean curd, carbonated beverages (beer), or other commercial goods or products, the quality of which is degraded at the time of freezing.

Although the above embodiments have described that the display label and the absorbent member are separate entities, the display label and the absorbent member may be integrated and adhered or attached to the base body. In addition, the above embodiments have described that the absorbent member and the display label are separate entities, the cover and the display label may be integrally formed to obtain a single member.

Further, although the above embodiments have described that the capsule is placed on the base body, the absorbent member may be placed on the base body and then the capsule may be placed thereon.

Although the above has described that the one formed into circular shape in plan view is used as the absorbent member, the absorbent member may be formed into a long rectangular shape to display a time-dependent change (elapsed time) by means of a colored dimension.

The temperature sensitive indicator according to the present invention is suitably used in a field of production, delivery and storage of products and commercial goods, in which the temperatures of fresh food, frozen food, cut flowers, medical goods, and semiconductor materials need to be controlled.

What is claimed is:

1. A temperature sensitive indicator, comprising:
    a base body;
    a capsule filled with a heat-sensitive material and placed on the base body;
    an absorbent member placed on an upper part of the capsule;
    a cover covering at least the capsule and the absorbent member; and
    capsule breaking means formed therein with a space through which at least the base body, the capsule, and the absorbent member are inserted,
    wherein the base body, the capsule, and the absorbent member are pulled out through the space of the capsule breaking means, whereby the capsule is broken by the capsule breaking means.

2. The temperature sensitive indicator according to claim 1, wherein the capsule breaking means is a holding member for holding at least the base body and the cover, and at least the base body, the capsule, and the absorbent member are pulled out of the holding member, whereby the capsule is broken by the holding member.

3. The temperature sensitive indicator according to claim 2, wherein the holding member is provided inside a case, the capsule and the absorbent member are contained in the case, the base body and the cover are contained in the case such that leading end parts of the base body and the cover are disposed outside the case, and wherein the base body and the cover disposed outside the case are pulled out and ejected to the outside of the case, whereby the capsule is broken.

4. The temperature sensitive indicator according to claim 3, wherein the display label is formed integrally with the cover.

5. The temperature sensitive indicator according to claim 1, wherein the capsule breaking means is a holding member for holding at least the base body and the cover, the cover is formed in a pouch-like shape, the base body, the capsule, and the absorbent member are housed inside the pouch-shaped cover, the holding member holds at least the base body and the cover, and wherein at least the base body, the capsule, and the absorbent member are pulled out through the space of the holding means, whereby the capsule is broken by the holding means.

6. The temperature sensitive indicator according to claim 5, wherein the holding member is provided inside a case, the capsule and the absorbent member are contained in the case, the base body and the cover are contained in the case such that leading end parts of the base body and the cover are disposed outside the case, and wherein the base body and the cover disposed outside the case are pulled out and ejected to the outside of the case, whereby the capsule is broken.

7. The temperature sensitive indicator according to claim 1, wherein the heat-sensitive material is a so-called wax that enters a liquid phase at a predetermined temperature or above, or a colored gel that enters a liquid phase at a predetermined temperature or lower.

8. The temperature sensitive indicator according to claim 1, wherein a concave part is formed on a lower surface of the absorbent member and the capsule is contained between the concave part and the base body.

9. The temperature sensitive indicator according to claim 1, wherein a concave part containing the capsule is formed on an upper surface of the base body, and the absorbent member covers an upper part of the concave part.

10. The temperature sensitive indicator according to claim 1, wherein a display label is formed integrally with the absorbent member.

11. A temperature sensitive indicator, comprising:
   a base body;
   an absorbent member placed on the base body;
   a capsule filled with a heat-sensitive material and placed on the absorbent member;
   a cover covering at least the capsule and the absorbent member; and
   capsule breaking means formed therein with a space through which at least the base body, the capsule, and the absorbent member are inserted,
   wherein the base body, the capsule, and the absorbent member are pulled out through the space of the capsule breaking means, whereby the capsule is broken by the capsule breaking means.

12. The temperature sensitive indicator according to claim 11, wherein the capsule breaking means is a holding member for holding at least the base body and the cover, and at least the base body, the capsule, and the absorbent member are pulled out of the holding member, whereby the capsule is broken by the holding member.

13. The temperature sensitive indicator according to claim 11, wherein the capsule breaking means is a holding member for holding at least the base body and the cover, the cover is formed in a pouch-like shape, the base body, the capsule, and the absorbent member are housed inside the pouch-shaped cover, the holding member holds at least the base body and the cover, and wherein at least the base body, the capsule, and the absorbent member are pulled out through the space of the holding means, whereby the capsule is broken by the holding means.

14. The temperature sensitive indicator according to claim 11, wherein the heat-sensitive material is a so-called wax that enters a liquid phase at a predetermined temperature or above, or a colored gel that enters a liquid phase at a predetermined temperature or lower.

15. The temperature sensitive indicator according to claim 11, wherein a display label is formed integrally with the absorbent member.

16. The temperature sensitive indicator according to claim 11, wherein a concave part is formed on a lower surface of the absorbent member and the capsule is contained between the concave part and the base body.

17. The temperature sensitive indicator according to claim 11, wherein a concave part containing the capsule is formed on an upper surface of the base body, and the absorbent member covers an upper part of the concave part.

* * * * *